US012804543B2

(12) United States Patent
Qi et al.

(10) Patent No.: US 12,804,543 B2
(45) Date of Patent: Nov. 17, 2026

(54) DISCONTINUOUS RECEPTION FOR MULTICAST AND BROADCAST SERVICE

(71) Applicant: ZTE CORPORATION, Shenzhen (CN)

(72) Inventors: Tao Qi, Shenzhen (CN); Lin Chen, Shenzhen (CN); Wei Luo, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 281 days.

(21) Appl. No.: 18/703,319

(22) PCT Filed: Oct. 21, 2021

(86) PCT No.: PCT/CN2021/125347
§ 371 (c)(1),
(2) Date: Apr. 19, 2024

(87) PCT Pub. No.: WO2023/065224
PCT Pub. Date: Apr. 27, 2023

(65) Prior Publication Data
US 2025/0240712 A1 Jul. 24, 2025

(51) Int. Cl.
*G08C 17/00* (2006.01)
*H04L 1/1812* (2023.01)
*H04W 52/02* (2009.01)
*H04W 72/23* (2023.01)
*H04W 72/30* (2023.01)
*H04W 76/28* (2018.01)

(52) U.S. Cl.
CPC ....... *H04W 52/0216* (2013.01); *H04L 1/1812* (2013.01); *H04W 72/23* (2023.01); *H04W 72/30* (2023.01); *H04W 76/28* (2018.02)

(58) Field of Classification Search
CPC . H04W 52/0216; H04W 76/28; H04W 72/30; H04W 72/23; H04L 1/1812; H04L 1/08; H04L 1/18
USPC .......................................................... 370/311
See application file for complete search history.

(56) References Cited

U.S. PATENT DOCUMENTS

2014/0119198 A1* 5/2014 Lee .................. H04W 52/0216 370/241
2019/0159281 A1* 5/2019 Amin .................... H04W 36/26
2021/0243836 A1* 8/2021 Wu ....................... H04W 72/20
2021/0251037 A1* 8/2021 Akkarakaran ........ H04W 76/28

FOREIGN PATENT DOCUMENTS

CN 102548004 A 7/2012
WO WO 2021189307 A1 9/2021

OTHER PUBLICATIONS

OPPO. "R2-2108926, 38.321 running CR for NR MBS", 3GPP TSG-RAN WG2 meeting #115 electronic, Sep. 9, 2021.
(Continued)

*Primary Examiner* — Temica M Beamer
(74) *Attorney, Agent, or Firm* — Knobbe, Martens, Olson & Bear, LLP

(57) ABSTRACT

A wireless communication method for use in a wireless terminal is disclosed. The method comprises receiving, from a wireless network node, configuration information associated with a discontinuous reception, DRX, for a multicast broadcast service, MBS, and performing the DRX configured based on the configuration information for the MBS.

19 Claims, 2 Drawing Sheets

(56) References Cited

OTHER PUBLICATIONS

Intel Corporation. "R2-2102839, MBS MAC Layer and Group Scheduling Aspects", 3GPP TSG-RAN WG2 Meeting #113bis-e, Apr. 2, 2021.
Huawei et al., "R2-2103525, RAN2 aspects of group scheduling", 3GPP TSG-RAN WG2 meeting #113bis-e, Apr. 2, 2021.
International Search Report for International Application No. PCT/CN2021/125347, dated Feb. 25, 2022.
CMCC. "R1-2104634, Discussion on NR MBS in RRC_IDLE/RRC_INACTIVE states", 3GPP TSG RAN WG1 #105-e, May 10, 2021~May 27, 2021.
CATT. "R2-2107034, Discussion on Scheduling and Power saving of MBS", 3GPP TSG-RAN WG2 meeting #115-e, Aug. 16, 2021~Aug. 27, 2021.
Media Tek Inc. "R2-2107049, DRX scheme for NR MBS", 3GPP TSG-RAN WG2 meeting #115 electronic, Aug. 16-17, 2021.
OPPO. "R2-2107205, Discussion on group-based scheduling for MBS", 3GPP TSG-RAN WG2 meeting #115 electronic online, Aug. 16-17, 2021.
Samsung. "R2-2107233, MBS Power Saving and Scheduling Aspects", 3GPP TSG-RAN WG2 meeting #115-e, Aug. 9-27, 2021.
Apple. "R2-2107577, DRX mechanism for MBS PTM reception", 3GPP TSG-RAN WG2 meeting #115-e, Aug. 9-27, 2021.
Lenovo. Motorola Mobility. "R2-2107920, MBS specific DRX operation and Data Inactivity Monitoring", 3GPP TSG-RAN WG2 meeting #115 electronic, Aug. 9-27, 2021.
Kyocera. "R2-2108002, Open issues on group scheduling for NR MBS", 3GPP TSG-RAN WG2 #115-e, Aug. 9-27, 2021.
LG Electronics Inc. "R2-2108551, Discussion on group scheduling and power saving", 3GPP TSG-RAN2 #115e, Aug. 16-27, 2021.

* cited by examiner

DISCONTINUOUS RECEPTION FOR MULTICAST AND BROADCAST SERVICE

CROSS-REFERENCE TO RELATED APPLICATIONS

This application is a National Stage Application, filed under 35 U.S.C. 371, based on International Patent Application No. PCT/CN2021/125347, filed on Oct. 21, 2021, the disclosure of which is incorporated herein by reference in its entirety.

This document is directed generally to wireless communications, in particular to 5th generation wireless communications.

Multicast and broadcast service (MBS) support is introduced into 5G new radio (NR). One of the major objectives of the MBS is supporting power saving for MBS receptions. In legacy techniques, one of the most effective power saving mechanism is Discontinuous reception (DRX). The DRX enables a user equipment (UE) to enter a power saving mode during data receptions/transmissions, e.g., to stop the monitoring and/or reception of control information/data in MAC/PHY (Medium Access Control/Physical) layer or to stop the whole or part of the radio component activity. Therefore, the power consumption is reduced.

It is anticipated that DRX will be applied to the MBS as a main technique solution for power efficient operation, especially in case of multicast support where hybrid automatic repeat request (HARQ) feedback and point-to-point (PTP) retransmission take place. Thus, how the network (e.g. gNB) configures the UE and how the UE behaves under the corresponding configuration are required to be discussed.

This document relates to methods, systems, and devices associated with the DRX mechanisms for the MBS, and in particular to methods, systems, and devices associated with configurations and UE behaviors of the DRX for the MBS.

The present disclosure relates to a wireless communication method for use in a wireless terminal. The method comprises:

- receiving, from a wireless network node, configuration information associated with a discontinuous reception, DRX, for a multicast broadcast service, MBS, and
- performing the DRX configured based on the configuration information for the MBS.

Various embodiments may preferably implement the following features:

Preferably, the configuration information comprises at least one of:

- an on-duration timer, associated with a duration at a beginning of a DRX cycle for the MBS,
- a slot offset, associated with a delay before starting the on-duration timer,
- a long cycle start offset, associated with a Long DRX cycle and a start offset for determining a subframe where at least one of the Long DRX cycle or a short DRX cycle starts,
- an inactivity timer, associated with a duration after a physical downlink control channel, PDCCH, occasion in which a PDCCH indicates a transmission,
- a first downlink, DL, hybrid automatic repeat request, HARQ, round trip time, RTT, timer, associated with a minimum duration before a DL assignment for an HARQ retransmission in a point-to-multi-point, PTM, retransmission,

- a second DL HARQ RTT timer, associated with a minimum duration before a DL assignment for an HARQ retransmission in a point-to-point, PTP, retransmission,
- a first DL retransmission timer, associated with a maximum duration until a DL retransmission in a PTM retransmission is received,
- a second DL retransmission timer, associated with a maximum duration until a DL retransmission in a PTP retransmission is received,
- an uplink, UL, HARQ RTT timer, associated with a minimum duration before a UL HARQ retransmission grant is expected to be received during an active time associated with the DRX for the MBS, or
- a UL retransmission timer, associated with a maximum duration until a grant for a UL retransmission is received during an active time associated with the DRX for the MBS.

Preferably, a long DRX cycle is used for the DRX for the MBS,

- wherein [(SFN×10)+subframe number] modulo (drx-LongCycleMBS)=drx-StartOffsetMBS,
- wherein the SFN is a system frame number, the subframe number is a numbering of a subframe, the drx-LongCycleMBS is a number of subframes in the long DRX cycle, and the drx-StartOffsetMBS is a start offset for the DRX for the MBS, and
- wherein performing the DRX for the MBS based on the configuration information comprises:
- starting an on-duration timer for the MBS after a slot offset comprised in the configuration information.

Preferably, at least one of an on-duration timer for the MBS, an inactivity timer for the MBS, a first DL retransmission timer associated with a PTM retransmission for the MBS, a second DL retransmission timer associated with a PTP retransmission for the MBS or a UL retransmission timer for the MBS is running, wherein performing the DRX configured based on the configuration information for the MBS comprises:

- monitoring a transmission associated with the MBS.

Preferably, at least one MBS radio bearer for the MBS is associated with a PTP transmission.

Preferably, at least one of the on-duration timer for the MBS or the inactivity timer for the MBS is running, and

- wherein the monitored transmission is identified by an identifier specific for the wireless terminal.

Preferably, a retransmission option for a PTP transmission is a PTP retransmission,

- wherein the monitored transmission comprises a PDCCH indicating a DL transmission, and
- wherein performing the DRX configured based on the configuration information for the MBS comprises at least one of:
  - starting a third DL HARQ RTT timer associated with terminal specific DRX for a HARQ process of the DL transmission after a transmission carrying a DL HARQ feedback of the HARQ process, or
- stopping a third DL retransmission timer associated with a terminal specific DRX for the HARQ process of the DL transmission.

Preferably, a retransmission option for a PTP transmission is a PTP retransmission,

- wherein the monitored transmission comprises a PDCCH indicating a DL transmission, and
- wherein performing the DRX configured based on the configuration information for the MBS comprises at least one of:

starting or restarting a second DL HARQ RTT timer for a HARQ process of the PTM DL transmission after a transmission carrying a DL HARQ feedback of the HARQ process, or stopping the second DL retransmission timer for the HARQ process of the PTM DL transmission.

Preferably, at least one MBS radio bearer for the MBS is associated with a PTM transmission.

Preferably, the PTM transmission is enabled.

Preferably, the PTM transmission is enabled by at least one of a radio resource control signaling or downlink control information received from the wireless network node.

Preferably, at least one of the on-duration timer for the MBS or the inactivity timer for the MBS is running, wherein the monitored transmission is identified by a group identifier for a wireless terminal group.

Preferably a retransmission option for the PTM transmission is a PTM retransmission, wherein the monitored transmission comprises a PDCCH indicating a PTM DL transmission, and wherein performing the DRX configured based on the configuration information for the MBS comprises at least one of:

starting or restarting a first DL HARQ RTT timer for a HARQ process of the PTM DL transmission after a transmission carrying a DL HARQ feedback of the HARQ process, or stopping the first DL retransmission timer for the HARQ process of the PTM DL transmission.

Preferably, a retransmission option for the PTM transmission is a PTP retransmission, wherein the monitored transmission comprises a PDCCH indicating a DL transmission, and wherein performing the DRX configured based on the configuration information for the MBS comprises at least one of:

starting a third DL HARQ RTT timer associated with a unicast service for a HARQ process of the DL transmission after a transmission carrying a DL HARQ feedback of the HARQ process, or stopping a third DL retransmission timer associated with a unicast service for the HARQ process of the DL transmission.

Preferably, a retransmission option for a PTM transmission is a PTP retransmission, wherein the monitored transmission comprises a PDCCH indicating a PTM DL transmission, and wherein performing the DRX configured based on the configuration information for the MBS comprises at least one of:

starting or restarting a second DL HARQ RTT timer for a HARQ process of the PTM DL transmission after a transmission carrying a DL HARQ feedback of the HARQ process, or stopping the second DL retransmission timer for the HARQ process of the PTM DL transmission.

Preferably, a retransmission option for a PTM transmission is a blind retransmission, wherein the monitored transmission comprises a PDCCH indicating a PTM DL transmission, and wherein performing the DRX configured based on the configuration information for the MBS comprises at least one of:

starting or restarting a first DL HARQ RTT timer for a HARQ process of the PTM DL transmission after an end of the PTM DL transmission, stopping the first DL retransmission timer for the HARQ process of the PTM DL transmission, or starting the first DL retransmission timer and monitoring the PTM DL transmission after the first DL HARQ RTT timer expires.

Preferably, a retransmission option for a PTM transmission is a blind retransmission, wherein the monitored transmission comprises a PDCCH indicating a PTM DL transmission, and wherein performing the DRX configured based on the configuration information for the MBS comprises at least one of:

monitoring the PTM DL transmission, or starting the first DL retransmission timer for a HARQ process of the PTM DL transmission after an end of the PTM DL transmission.

Preferably, the monitored transmission comprises a PDCCH on at least one serving cell of the DRX.

Preferably, the PDCCH indicates an initial transmission on one of the at least one serving cell of the DRX, and wherein performing the DRX configured based on the configuration information for the MBS further comprises:

starting or restarting the inactivity timer for the MBS after receiving the PDCCH indicating the initial transmission.

Preferably, the PDCCH is identified by a terminal specific identifier for the wireless terminal or a group specific identifier for a wireless terminal group.

Preferably, the PDCCH indicating an initial PTM transmission on one of the at least one serving cell of the DRX, and wherein performing the DRX configured based on the configuration information for the MBS further comprises:

starting or restarting the inactivity timer for the MBS after receiving the PDCCH indicating the initial PTM transmission.

Preferably, during an active time of the DRX for the MBS, a media access control protocol data unit, MAC PDU, is transmitted in a configured uplink grant and a Listen Before Talk failure indication is not received from lower layers, wherein performing the DRX configured based on the configuration information for the MBS comprises at least one of:

starting a UL HARQ RTT timer of the MBS for a HARQ process in the first symbol after the end of the first transmission of at least one physical uplink shared channel, PUSCH, transmission corresponding to the MAC PDU; or stopping an UL retransmission timer of the MBS for a HARQ process at the first transmission of at least one PUSCH transmission corresponding to the MAC PDU.

Preferably, during an active time of the DRX for the MBS, a MAC PDU is transmitted in a configured uplink grant and an LBT failure indication is not received from lower layers, wherein performing the DRX configured based on the configuration information for the MBS comprises at least one of:

starting a HARQ RTT timer defined in a terminal specific DRX for a HARQ process in the first symbol after the end of the first transmission of at least one PUSCH transmission corresponding to the MAC PDU; or stopping a UL retransmission timer defined in a terminal specific DRX for a HARQ process at the first transmission of at least one PUSCH transmission corresponding to the MAC PDU.

Preferably, the wireless communication method further comprises receiving, from the wireless network node, at least one of a radio resource control signaling or downlink control information indicating at least one retransmission opinion for at least one of a PTP transmission or a PTM transmission.

The present disclosure relates to a wireless communication method for use in a wireless network node. The method comprises transmitting, to a wireless terminal, configuration information associated with a discontinuous reception, DRX, for a multicast broadcast service, MBS.

Various embodiments may preferably implement the following features:

Preferably, the configuration information comprises at least one of:

- an on-duration timer, associated with a duration at a beginning of a DRX cycle for the MBS,
- a slot offset, associated with a delay before starting the on-duration timer,
- a long cycle start offset, associated with a long DRX cycle and a start offset for determining a subframe where at least one of the long DRX cycle or a short DRX cycle starts,
- an inactivity timer, associated with a duration after a physical downlink control channel, PDCCH, occasion in which a PDCCH indicates a transmission,
- a first downlink, DL, hybrid automatic repeat request, HARQ, round trip time, RTT, timer, associated with a minimum duration before a DL assignment for an HARQ retransmission in a point-to-multi-point, PTM, retransmission,
- a second DL HARQ RTT timer, associated with a minimum duration before a DL assignment for an HARQ retransmission in a point-to-point, PTP, retransmission,
- a first DL retransmission timer, associated with a maximum duration until a DL retransmission in a PTM retransmission is received,
- a second DL retransmission timer, associated with a maximum duration until a DL retransmission in a PTP retransmission is received,
- an uplink, UL, HARQ RTT timer, associated with a minimum duration before a UL HARQ retransmission grant is expected to be received during an active time associated with the DRX for the MBS, or
- a UL retransmission timer, associated with a maximum duration until a grant for a UL retransmission is received during an active time associated with the DRX for the MBS.

Preferably, the UL HARQ RTT timer and the UL retransmission timer are associated with a terminal specific DRX.

Preferably, the wireless communication method further comprises transmitting, to the wireless terminal, at least one of a radio resource control signaling or downlink control information associated with enabling a point-to-multi-point, PTM, transmission.

Preferably, the wireless communication method further comprises transmitting, to the wireless terminal, at least one of a radio resource control signaling or downlink control information indicating at least one retransmission opinion for at least one of a point-to-point, PTP, transmission or a PTM transmission.

The present disclosure relates to a wireless terminal. The wireless terminal comprises:

- a communication unit, configured to receive, from a wireless network node, configuration information associated with a discontinuous reception, DRX, for a multicast broadcast service, MBS, and
- a processor configured to perform the DRX configured based on the configuration information for the MBS.

Various embodiments may preferably implement the following feature:

Preferably, the processor is further configured to perform any of the aforementioned wireless communication methods.

The present disclosure relates to wireless network node. The wireless network node comprises:

- a communication unit, configured to transmit, to a wireless terminal, configuration information associated with a discontinuous reception, DRX, for a multicast broadcast service, MBS.

Various embodiments may preferably implement the following feature:

Preferably, the wireless network node further comprises a processor configured to perform any of the aforementioned wireless communication methods.

The present disclosure relates to a computer program product comprising a computer-readable program medium code stored thereupon, the code, when executed by a processor, causing the processor to implement a wireless communication method recited in any one of foregoing methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

Figure 1:
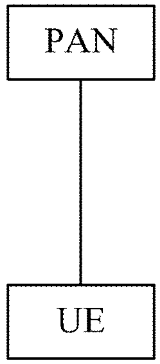
FIG. 1 shows a schematic diagram of a network system according to an embodiment of the present disclosure.

FIG. 1 shows a schematic diagram of a network system (architecture) according to an embodiment of the present disclosure. In FIG. 1, the network comprises a UE and a radio access network (RAN). In the present disclosure, the RAN may be equal to a RAN node or a next-generation RAN (NG-RAN) (node). For example, the RAN may be a base station (BS) or a gNB.

Note that the network system may further comprise other network entities and/or network functions, which are omitted in FIG. 1 for brevity. For instance, the network system may further comprise at least one of an access and mobility management function (AMF), a session management function (SMF), a user plane function (UPF), an application function (AF), a unified data management (UDM), a policy control function (PCF), a network exposure function (NEF), a core network (CN), . . . , etc.

In some embodiments, a media access control (MAC) entity may be configured by a radio resource control (RRC) signaling with a DRX functionality that controls physical downlink control channel (PDCCH) monitoring activities of the UE for radio network temporary identifier(s) (RNTI(s)) of the MAC entities (e.g. Cell Radio Network Temporary Identifier (C-RNTI), Configured Scheduling Radio Network Temporary Identifier (CS-RNTI), etc.). Each RNTI identifies a transmission for data or control information. For the MBS, the UE may be configured with a group RNTI (G-RNTI) that is used to identify MBS point to multi-point (PTM) transmissions. In the present disclosure, the related physical control channel associated with the PTM transmissions is called Group common PDCCH (GC-PDCCH).

In some embodiments, the DRX for a unicast service comprises a set of timers as below:

- drx-onDurationTimer: the duration at the beginning of a DRX cycle;
- drx-SlotOffset: the delay before starting the drx-onDuration Timer;
- drx-LongCycleStartOffset: the Long DRX cycle and drx-StartOffset which defines the subframe where the Long and Short DRX cycle starts;
- drx-InactivityTimer: the duration after the PDCCH occasion in which a PDCCH indicates a new UL or DL transmission for the MAC entity;
- drx-RetransmissionTimerDL (per DL HARQ process except for the broadcast process): the maximum duration until a DL retransmission is received;
- drx-RetransmissionTimerUL (per UL HARQ process): the maximum duration until a grant for UL retransmission is received;
- drx-HARQ-RTT-TimerDL (per DL HARQ process except for the broadcast process): the minimum duration before a DL assignment for HARQ retransmission is expected by the MAC entity;
- drx-HARQ-RTT-TimerUL (per UL HARQ process except for the broadcast process): the minimum duration before a UL assignment for HARQ retransmission is expected by the MAC entity.

The DRX mechanism defines when the UE should stay active (in DRX Active Time) and monitor the PDCCH transmission and when the timers should be started and the retransmission behavior of the UE MAC entity.

In some embodiments, the MBS is served in air interface by a type of radio bearer called MBS radio bearer (MRB) of an MBS supporting node (e.g., a RAN node or gNB that supports the MBS). The MRB may be with different configurations, e.g. with (only) the PTP Transmission, or (only) the PTM Transmission, or both the PTP and the PTM transmissions (so called split MRB). In the present disclosure, the PTP Transmission and the PTM Transmission may be defined as follows:

- PTP Transmission: The MBS supporting node (e.g. gNB) utilizes a UE-specific Radio Link Control (RLC) entity to individually generate and deliver separate copies of MBS data packets to each UE independently, and uses the PDCCH with cyclic redundancy check (CRC) scrambled by a UE-specific RNTI (e.g. C-RNTI) to schedule a UE-specific physical downlink shared channel (PDSCH) which is scrambled with the same UE-specific RNTI.
- PTM Transmission: The MBS supporting point (e.g. gNB) utilizes a group RLC entity to generate and deliver copies of MBS data packets to a set of UEs independently, and uses the GC-PDCCH with the CRC scrambled by a GC-RNTI or G-RNTI to schedule group-common PDSCH (GC-PDSCH) which is scrambled with the same GC-RNTI or G-RNTI. In later part of the document we will use G-RNTI.

In some embodiments, the MRB may comprise the following configuration options:

1. only a UE specific RLC entity with PTP Transmission (i.e. PTP only MRB);
2. only a group RLC entity with PTM Transmission (i.e. PTM only MRB);
3. both UE specific and group RLC entities with PTP Transmission and PTM Transmission respectively (i.e., split MRB).

In some embodiments, the MRB configuration (e.g. one of the above configurations) is sent to UE in an RRC signaling.

In some embodiments, the network is able to deactivate/activate the PTM Transmission in case of split MRB. If the PTM Transmission is deactivated, the UE stops monitoring the G-RNTI transmissions (i.e. the transmission associated with the G-RNTI).

In some embodiments, the PTM activation and deactivation operation might be sent to UE in a MAC control element (CE) or through Layer 1 control information (e.g., DCI), to indicate that the PTM transmission for an MBS or an MRB associated with the MBS is deactivated or activated.

In some embodiments, for the PTM Transmission, there might be L1 retransmissions associated with the PTM Transmissions to enhance the reliability. There are a few options for the L1 retransmission:

1. Layer 1 PTM retransmission for a PTM initial transmission (i.e., PTM retransmission for the PTM Transmissions): For an initial PTM transmission, the associated retransmission for the same transport block (TB) is in the PTM Transmission (i.e., the transmission identified by the G-RNTI for a group of UEs) in MAC/PHY layer. Please note that in order to be distinguished from the PTP/PTM Transmission for Layer 2, the term "Layer 1" is used here to describe the transmission.
2. Layer 1 PTP retransmission for a PTM initial transmission (i.e., PTP retransmission for PTM Transmissions): For an initial PTM transmission, the associated retransmission for the same TB is in the PTP transmission (i.e. the transmission identified by the C-RNTI for one specific UE) in the MAC/PHY layer. Please note that in order to be distinguished from the PTP/PTM Transmission for Layer 2 definition, the term "Layer 1" is used here to describe the transmission.

In some embodiments, the network may explicitly indicate that there is a retransmission without relying on feedback from the UE, i.e., a blind retransmission. For the blind retransmission, there is no HARQ feedback for the associated transmission and the network dynamically schedules the same TB by using the same HARQ process as the initial transmission.

In the present disclosure, the retransmission options (which includes PTP retransmissions for PTP (initial) transmission, PTM retransmission for PTM (initial) transmission, PTP retransmission for PTM (initial) transmission, or blind retransmission for PTM (initial) transmission) may be indicated to UE in following methods:

1 RRC signaling: This is a more of a semi static way to configure that for one UE or for some specific HARQ process/processes (identified by HARQ process IDs) of the MAC entity of the UE serving cell.

2. DCI: It is in a per transmission manner, that is to say, for each transmission, the retransmission option is indicated in real time by the DCI that includes the control information for MBS data reception in physical layer.

In some embodiments, the UE may receive, from the network (e.g. BS), configuration information associated with the DRX for the MBS (i.e. MBS DRX). The configuration information associated with the MBS DRX may be divided into two sets:

1. Set 1: At least one of drx-onDuration TimerMBS, drx-SlotOffsetMBS, drx-LongCycleStartOffsetMBS, drx-InactivityTimerMBS, drx-Retransmission TimerDL1, drx-HARQ-RTT-TimerDL1, drx-RetransmissionTimerDL2, drx-HARQ-RTT-TimerDL2;
2. Set 0: At least one of drx-onDurationTimer, drx-SlotOffset, drx-LongCycleStartOffset, drx-InactivityTimer, drx-HARQ-RTT-TimerUL0, drx-RetransmissionTimerUL0, drx-RetransmissionTimerDL0, drx-HARQ-RTT-TimerDL0.

In some embodiments, the configuration information associated with the DRX for the MBS may further comprises timer drx-RetransmissionTimerULMBS and/or drx-HARQ-RTT-TimerULMBS. In some embodiments, the UE may reuse the drx-RetransmissionTimerUL and/or the drx-HARQ-RTT-TimerUL associated with the DRX for the unicast service (associated with the UE specific DRX), respectively, as the drx-Retransmission TimerULMBS and/or the drx-HARQ-RTT-TimerULMBS.

In some embodiments, the configuration information for the MBS DRX configuration may be configured to the UE in the same RRC message or separate configurations.

In the present disclosure, the timers and the parameters in the configuration information associated with the MBS DRX are defined as the following:

drx-onDurationTimerMBS: the duration at the beginning of a DRX cycle for the MBS.

drx-SlotOffsetMBS: the delay before starting the drx-onDurationTimerMBS.

drx-LongCycleStartOffsetMBS: the Long DRX cycle and drx-StartOffsetMBS which defines the subframe where the Long and Short DRX cycle starts;

drx-Inactivity TimerMBS: the duration after the PDCCH occasion in which a PDCCH indicates a new UL or DL transmission for the MAC entity; the PDCCH can be UE specific PDCCH or a GC-PDCCH, a GC-PDCCH indicated a new DL transmission of the MBS;

drx-HARQ-RTT-TimerDL1 (per DL HARQ process): the minimum duration before a DL assignment for HARQ retransmission in PTM is expected by the MAC entity;

drx-HARQ-RTT-TimerDL2 (per DL HARQ process): the minimum duration before a DL assignment for HARQ retransmission in PTP is expected by the MAC entity;

drx-Retransmission TimerDL1 (per DL HARQ process): the maximum duration until a DL retransmission in PTM is received;

drx-RetransmissionTimerDL2 (per DL HARQ process): the maximum duration until a DL retransmission in PTP is received;

drx-Retransmission TimerULMBS (per UL HARQ process): the maximum duration until a grant for UL retransmission is received during active time associated with the MBS DRX;

drx-HARQ-RTT-TimerULMBS (per UL HARQ process): the minimum duration before a UL HARQ retransmission grant is expected by the MAC entity during active time associated with the MBS DRX.

In some embodiments, the MBS DRX configuration (e.g. timer) might be associated with one specific cell or a cell list. In some embodiments, the MBS transmission is indicated to be transmitted in specific cells and the associated MBS DRX applies in the configured cells. The UE monitors the MBS transmission according to the above defined DRX timers. In the following, the MBS DRX for such MBS is also called a DRX group that applies to such cells.

Note that the drx-HARQ-RTT-TimerUL0, the drx-RetransmissionTimerUL0, the drx-RetransmissionTimerDL0 and the drx-HARQ-RTT-TimerDL0 in set 0 may be the drx-HARQ-RTT-TimerUL, the drx-RetransmissionTimerUL, the drx-RetransmissionTimerDL and the drx-HARQ-RTT-TimerDL associated with the DRX for the unicast service or UE-specific DRX, respectively, in the present disclosure.

On Duration for the MBS DRX:

In some embodiments, the DRX mechanism associated with an on duration of the MBS DRX may be:

for a System Frame Number (SFN), if the Long DRX cycle is used for a DRX group for the MBS and [(SFN×10)+subframe number] modulo (drx-LongCycleMBS)=drx-StartOffsetMBS:

starting a drx-onDurationTimerMBS for this DRX group after drx-SlotOffsetMBS from the beginning of the subframe.

Active Time for MBS DRX:

Because of the configured MBS DRX, the UE needs to monitor the PTM initial transmissions, related re-transmissions (PTM re-transmission or PTP re-transmission for the PTM transmissions) and/or the possible PTP transmission with its possible re-transmissions.

Thus, the active time for the MBS DRX has to cover the above-mentioned transmissions. For example, when the (MBS) DRX is configured, the active time for serving cells in a DRX group includes the time while:

drx-onDurationTimer or drx-InactivityTimer configured for the DRX group is running; or drx-RetransmissionTimerDL or drx-RetransmissionTimerUL is running on any Serving Cell in the DRX group; or drx-onDurationTimerMBS or drx-InactivityTimerMBS configured for the DRX group is running; or drx-RetransmissionTimerDL1 or drx-RetransmissionTimerDL2 or drx-RetransmissionTimerULMBS is running on any Serving Cell in the DRX group.

UE Behavior in Active Time:

In an embodiment, the UE monitors per UE transmission identified by the C-RNTI in case of specific MRB configurations in the active time due to the running drx-onDurationTimerMBS and/or drx-InactivityTimerMBS:

there is at least one of the MRB associated with the MBS is PTP only MRB, or there is at least one of the MRB associated with the MBS is split MRB.

In an embodiment, whether the UE needs to monitor per group PTM Transmission identified by the G-RNTI in case of specific MRB configurations in the active time due to the running drx-onDurationTimerMBS and/or drx-Inactivity-TimerMBS:

there is at least one of the MRB associated with the MBS is PTM only MRB, or there is at least one of the MRB associated with the MBS is split MRB, or there is at least one of the MRB associated with the MBS is split MRB and the PTM Transmission is activated.

Non-Retransmission Related Timer:

In the following, the non-retransmission related timer (e.g. drx-InactivityTimerMBS) and related UE behavior are discussed.

In an embodiment, if a DRX group is in the Active Time, the UE monitor the PDCCH (identified by the C-RNTI or the G-RNTI) on the Serving Cells in this DRX group as specified in this document. In this embodiment, if the PDCCH indicates a new transmission (either DL or UL) on a Serving Cell in this DRX group:

The UE starts or restarts the drx-Inactivity TimerMBS for this DRX group, e.g., in the first symbol after the end of the PDCCH (identified by the C-RNTI or the G-RNTI) reception.

In an embodiment, if a DRX group is in Active Time, the UE monitors PDCCH (C-RNTI or G-RNTI) on the Serving Cells in this DRX group as specified in this document. In this embodiment, if the PDCCH indicates a new PTM transmission (either DL or UL) on a Serving Cell in this DRX group:

The UE starts or restarts the drx-Inactivity TimerMBS for this DRX group in the first symbol after the end of the group specific PDCCH (i.e., the GC-PDCCH) reception.

Retransmission Related Timer:

In the following, the re-transmission related timer (i.e, drx-HARQ-RTT-TimerDL1, drx-HARQ-RTT-TimerDL2, drx-RetransmissionTimerDL1, drx-RetransmissionTimerDL1, drx-RetransmissionTimerULMBS, drx-HARQ-RTT-TimerULMBS) and associated UE behaviors are discussed.

In following embodiments, the PTM transmission is enabled by at least one of the following scenarios:

by default; or in case of PTM only MRB; or in case of split MRB; or in case of split MRB and the PTM transmission is activated.

In addition, a retransmission option for the PTM (initial) transmission may be indicated by the RRC signaling or the DCI from the network (e.g. BS).

PTM Retransmission for PTM Transmission:

In an embodiment, the re-transmission option is PTM re-transmission for the PTM transmission (either indicated in RRC signaling or DCI):

if the PDCCH indicates a PTM DL transmission, the UE behavior comprises at least one of:

start the drx-HARQ-RTT-TimerDL1 for the corresponding HARQ process in the first symbol after the end of the corresponding transmission carrying the DL HARQ feedback;

stop the drx-RetransmissionTimerDL1 for the corresponding HARQ process.

PTP Retransmission for PTM Transmission:

In an embodiment, the re-transmission option is PTP re-transmission for the PTM transmission:

if the PDCCH indicates a PTM DL transmission, the UE behavior comprises at least one of:

start the drx-HARQ-RTT-TimerDL0 for the corresponding HARQ process in the first symbol after the end of the corresponding transmission carrying the DL HARQ feedback;

stop the drx-RetransmissionTimerDL0 for the corresponding HARQ process.

In an embodiment, the re-transmission option is PTP re-transmission for the PTM transmission:

if the PDCCH indicates a PTM DL transmission, the UE behavior comprises at least one of:

start the drx-HARQ-RTT-TimerDL2 for the corresponding HARQ process in the first symbol after the end of the corresponding transmission carrying the DL HARQ feedback; and/or stop the drx-RetransmissionTimerDL2 for the corresponding HARQ process.

Blind Retransmission in PTM Transmission:

In an embodiment, the re-transmission option is blind re-transmission for the PTM transmission:

if the PDCCH indicates a PTM DL transmission, the UE behavior comprises at least one of:

start the drx-HARQ-RTT-TimerDL1 for the corresponding HARQ process after the end of the PTM DL transmission, e.g, in the first symbol after the end of the PTM DL transmission;

stop the drx-RetransmissionTimerDL1 for the corresponding HARQ process; and/or after the drx-HARQ-RTT-TimerDL1 expires, start the drx-RetransmissionTimerDL1 for the corresponding HARQ process and monitor the PTM transmission identified by the G-RNTI.

In an embodiment, the re-transmission option is blind re-transmission for the PTM transmission:

if the PDCCH indicates a PTM DL transmission, the UE behavior comprises at least one of:

monitor the PTM transmission identified by G-RNTI;

start the drx-RetransmissionTimerDL1 for the corresponding HARQ process after the end of the PTM DL transmission, e.g., in the first symbol after the end of the PTM DL transmission.

PTP Transmission:

In an embodiment of the UE receiving the PTP initial transmission, the UE monitors the associated PTP re-transmission based on the per UE DRX group configuration:

if the PDCCH indicates a DL transmission, the UE behavior comprises at least one of:

start the drx-HARQ-RTT-TimerDL0 for the corresponding HARQ process in the first symbol after the end of the corresponding transmission carrying the DL HARQ feedback;

stop the drx-RetransmissionTimerDL0 for the corresponding HARQ process.

In an embodiment of the UE receiving the PTP initial transmission, the UE monitors the associated PTP re-transmission based on the MBS DRX configuration for the PTP re-transmission for the PTM transmission:

if the PDCCH indicates a DL transmission, the UE behavior comprises at least one of:

start the drx-HARQ-RTT-TimerDL0 for the corresponding HARQ process in the first symbol after the end of the corresponding transmission carrying the DL HARQ feedback;

stop the drx-RetransmissionTimerDL0 for the corresponding HARQ process.

Uplink Re-Transmission:

In an embodiment, the UE is able to do uplink transmissions during the active time of the MBS DRX and the re-transmission behavior follows the MBS specific timer, e.g., the drx-HARQ-RTT-TimerULMBS and/or the drx-RetransmissionTimerULMBS. The UE behavior may be defined as the following, during the active time of the MBS DRX:

- if a media access control protocol data unit (MAC PDU) is transmitted in a configured uplink grant and a Listen Before Talk (LBT) failure indication is not received from lower layers:
- start the drx-HARQ-RTT-TimerULMBS for the corresponding HARQ process in the first symbol after the end of the first transmission (within a bundle) of the corresponding PUSCH transmission(s); and/or
- stop the drx-RetransmissionTimerULMBS for the corresponding HARQ process at the first transmission (within a bundle) of the corresponding PUSCH transmission(s).

In an embodiment, the UE is able to do uplink transmissions during the active time of the MBS DRX and the re-transmission behavior follows the UE specific timer defined in the per UE DRX configuration, e.g., the drx-HARQ-RTT-TimerUL and/or the drx-RetransmissionTimerUL. The UE behavior may be defined as the following, during the active time of the MBS DRX:

- if a MAC PDU is transmitted in a configured uplink grant and an LBT failure indication is not received from lower layers:
- start the drx-HARQ-RTT-TimerUL for the corresponding HARQ process in the first symbol after the end of the first transmission (within a bundle) of the corresponding PUSCH transmission(s); and/or
- stop the drx-RetransmissionTimerUL for the corresponding HARQ process at the first transmission (within a bundle) of the corresponding PUSCH transmission(s).

The present disclosure provides a framework of the DRX design for the MBS, especially for Multicast transmissions, where potential re-transmission applies. In addition, the framework defines UE MAC behavior under different MRB configurations which include different MBS bearer configurations and different re-transmission configurations.

Figure 2:
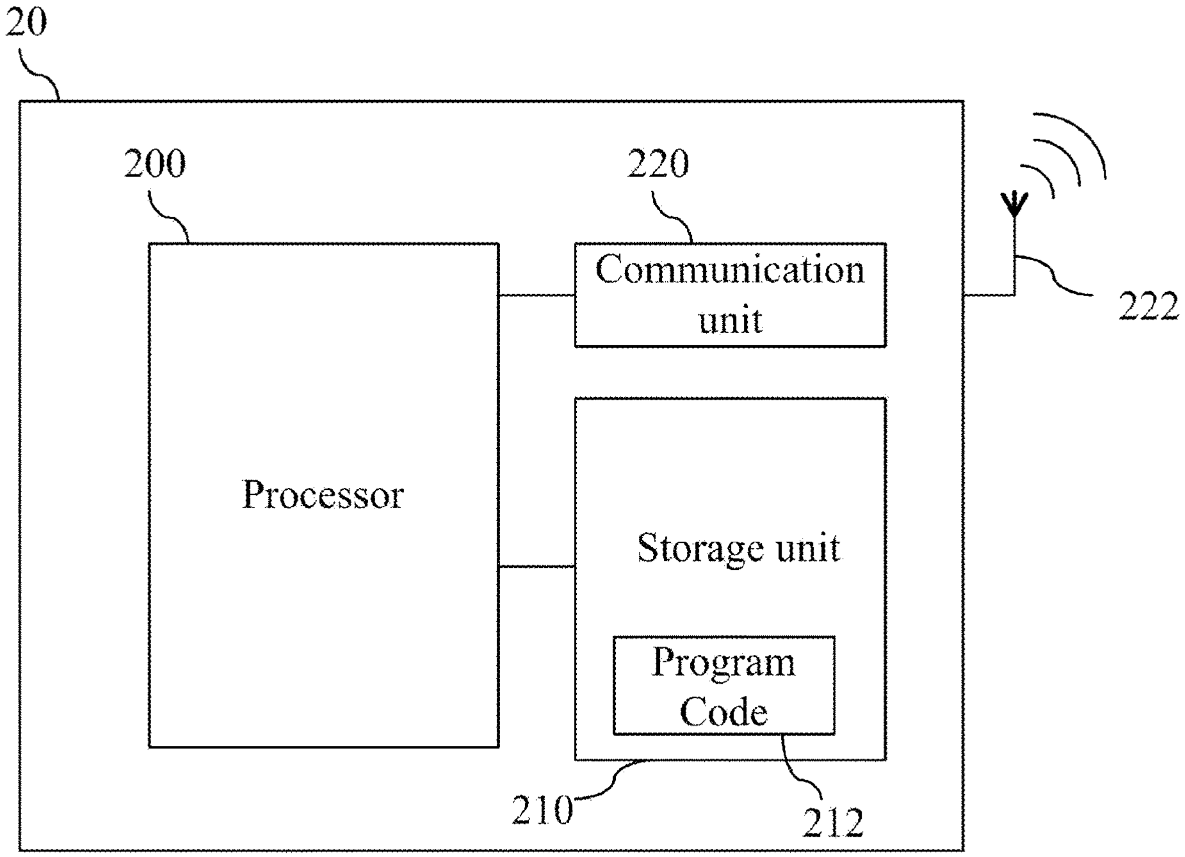
FIG. 2 shows an example of a schematic diagram of a wireless terminal according to an embodiment of the present disclosure.

FIG. 2 relates to a schematic diagram of a wireless terminal 20 according to an embodiment of the present disclosure. The wireless terminal 20 may be a user equipment (UE), a mobile phone, a laptop, a tablet computer, an electronic book or a portable computer system and is not limited herein. The wireless terminal 20 may include a processor 200 such as a microprocessor or Application Specific Integrated Circuit (ASIC), a storage unit 210 and a communication unit 220. The storage unit 210 may be any data storage device that stores a program code 212, which is accessed and executed by the processor 200. Embodiments of the storage unit 212 include but are not limited to a subscriber identity module (SIM), read-only memory (ROM), flash memory, random-access memory (RAM), hard-disk, and optical data storage device. The communication unit 220 may a transceiver and is used to transmit and receive signals (e.g. messages or packets) according to processing results of the processor 200. In some embodiments, the communication unit 220 transmits and receives the signals via at least one antenna 222 shown in FIG. 2.

In some embodiments, the storage unit 210 and the program code 212 may be omitted and the processor 200 may include a storage unit with stored program code.

The processor 200 may implement any one of the steps in exemplified embodiments on the wireless terminal 20, e.g., by executing the program code 212.

The communication unit 220 may be a transceiver. The communication unit 220 may as an alternative or in addition be combining a transmitting unit and a receiving unit configured to transmit and to receive, respectively, signals to and from a wireless network node (e.g. a base station).

Figure 3:
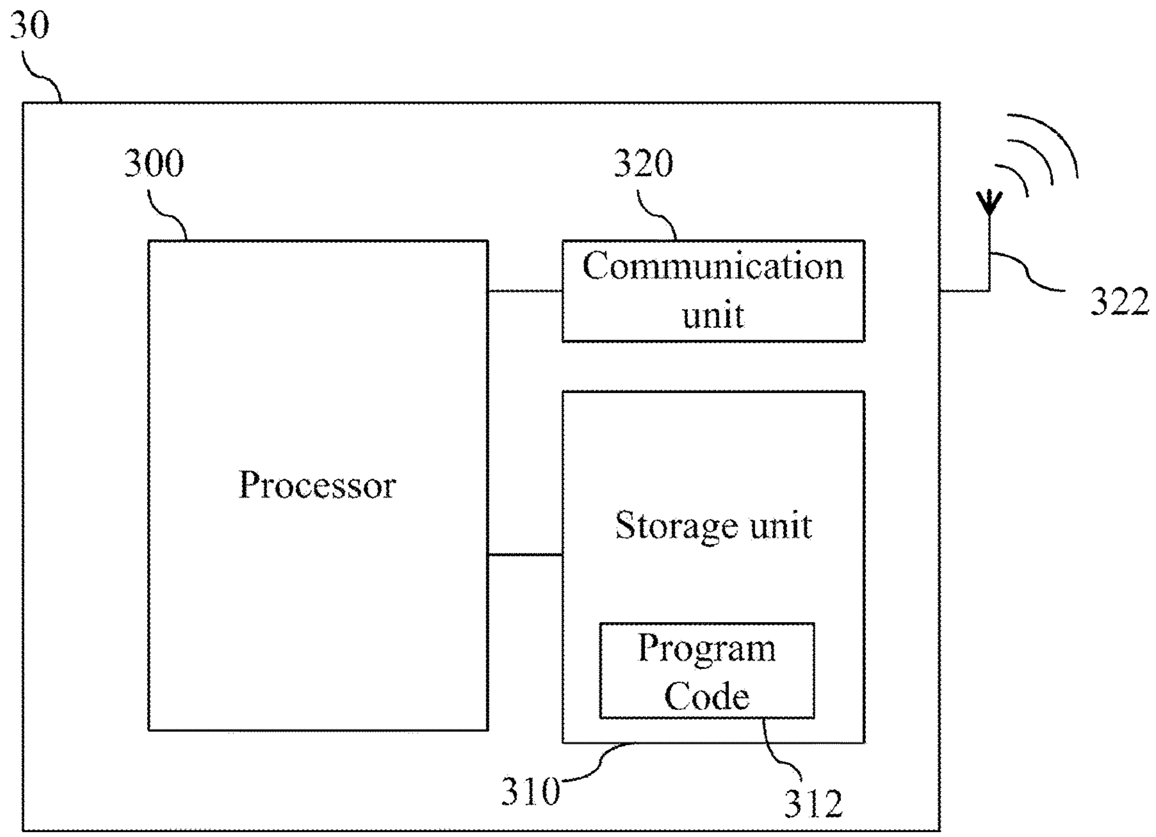
FIG. 3 shows an example of a schematic diagram of a wireless network node according to an embodiment of the present disclosure.

FIG. 3 relates to a schematic diagram of a wireless network node 30 according to an embodiment of the present disclosure. The wireless network node 30 may be a satellite, a base station (BS), a network entity, a Mobility Management Entity (MME), Serving Gateway (S-GW), Packet Data Network (PDN) Gateway (P-GW), a radio access network (RAN) node, a next generation RAN (NG-RAN) node, a gNB, an eNB, a gNB central unit (gNB-CU), a gNB distributed unit (gNB-DU) a data network, a core network or a Radio Network Controller (RNC), and is not limited herein. In addition, the wireless network node 30 may comprise (perform) at least one network function such as an access and mobility management function (AMF), a session management function (SMF), a user place function (UPF), a policy control function (PCF), an application function (AF), etc. The wireless network node 30 may include a processor 300 such as a microprocessor or ASIC, a storage unit 310 and a communication unit 320. The storage unit 310 may be any data storage device that stores a program code 312, which is accessed and executed by the processor 300. Examples of the storage unit 312 include but are not limited to a SIM, ROM, flash memory, RAM, hard-disk, and optical data storage device. The communication unit 320 may be a transceiver and is used to transmit and receive signals (e.g. messages or packets) according to processing results of the processor 300. In an example, the communication unit 320 transmits and receives the signals via at least one antenna 322 shown in FIG. 3.

In some embodiments, the storage unit 310 and the program code 312 may be omitted. The processor 300 may include a storage unit with stored program code.

The processor 300 may implement any steps described in exemplified embodiments on the wireless network node 30, e.g., via executing the program code 312.

The communication unit 320 may be a transceiver. The communication unit 320 may as an alternative or in addition be combining a transmitting unit and a receiving unit configured to transmit and to receive, respectively, signals to and from a wireless terminal (e.g. a user equipment or another wireless network node).

Figure 4:
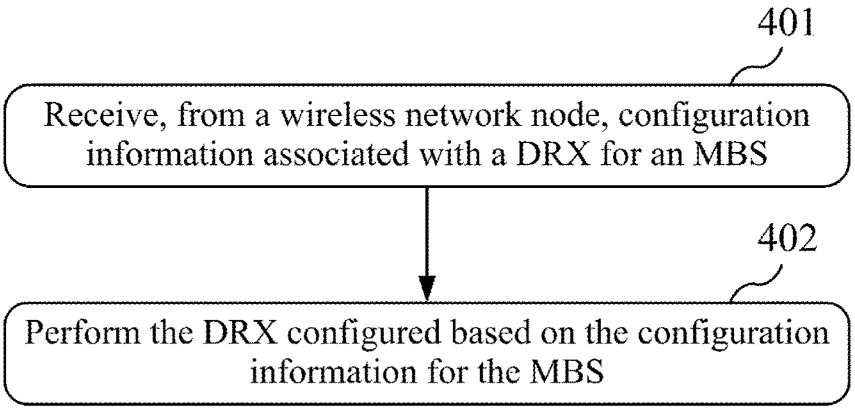
FIG. 4 shows a flowchart of a method according to an embodiment of the present disclosure.

FIG. 4 shows a flowchart of a method according to an embodiment of the present disclosure. The method may be used in a wireless terminal (e.g. UE) and comprises the following steps:

Step 401: Receive, from a wireless network node, configuration information associated with a DRX for an MBS.

Step 402: Perform the DRX configured based on the configuration information for the MBS.

In FIG. 4, the wireless terminal receives configuration information associated with a DRX for an MBS (i.e. MBS DRX) from a wireless network node (e.g. network, RAN node, gNB, BS). The configuration is associated with configurations of the DRX for the MBS. The wireless terminal performs the DRX configured based on the configuration information for the MBS.

In an embodiment, the configuration information comprises (e.g. indicates) at least one of:

an on-duration timer (e.g. drx-onDurationTimerMBS), associated with a duration at a beginning of a DRX cycle for the MBS, a slot offset (e.g. drx-SlotOffsetMBS), associated with a delay before starting the on-duration timer, a long cycle start offset (e.g. drx-LongCycleStartOffsetMBS), associated with a Long DRX cycle and a start offset for determining a subframe where at least one of the Long DRX cycle or a short DRX cycle starts, an inactivity timer (e.g. drx-InactivityTimerMBS), associated with a duration after a physical downlink control channel, PDCCH, occasion in which a PDCCH indicates a transmission, a first DL HARQ timer (e.g. drx-HARQ-RTT-TimerDL1), associated with a minimum duration before a DL assignment for an HARQ retransmission in a PTM retransmission, a second DL HARQ RTT timer (e.g. drx-HARQ-RTT-TimerDL2), associated with a minimum duration before a DL assignment for an HARQ retransmission in a PTP retransmission, a first DL retransmission timer (e.g. drx-Retransmission-TimerDL1), associated with a maximum duration until a DL retransmission in a PTM retransmission is received, a second DL retransmission timer (e.g. drx-RetransmissionTimerDL2), associated with a maximum duration until a DL retransmission in a PTP retransmission is received, a UL HARQ RTT timer (e.g. drx-HARQ-RTT-TIMER-ULMBS), associated with a minimum duration before a UL HARQ retransmission grant is expected to be received during an active time associated with the DRX for the MBS, or a UL retransmission timer (e.g. drx-RetransmissionTimerULMBS), associated with a maximum duration until a grant for a UL retransmission is received during an active time associated with the DRX for the MBS.

In an embodiment, a long DRX cycle is used for the MBS DRX and $$[(\text{SFN}\times 10)+\text{subframe number}]\text{modulo}(\text{drx-LongCycleMBS})=\text{drx-StartOffsetMBS},$$

wherein the SFN is a system frame number, the subframe number is a numbering of a subframe, the drx-LongCycleMBS is a number of subframes in the long DRX cycle, and the drx-StartOffsetMBS is a start offset for the MBS DRX. Under such conditions, the wireless terminal is in an on-duration of the MBS DRX. The wireless terminal starts an on-duration timer for the MBS after a slot offset comprised in the configuration information.

In an embodiment, at least one of an on-duration timer for the MBS, an inactivity timer for the MBS, a first DL retransmission timer associated with a PTM retransmission for the MBS, a second DL retransmission timer associated with a PTP retransmission for the MBS or a UL retransmission timer for the MBS is running. Under such a condition, the wireless terminal is in an active time of the MBS DRX. The wireless terminal may monitor a transmission associated with the MBS in the active time.

In an embodiment, at least one MRB for the MBS is associated with a PTP transmission (i.e. PTP only MRB and/or split MRB).

In an embodiment of being in the active time (of the MBS DRX) due to the running of at least one of the on-duration timer for the MBS or the inactivity timer for the MBS, the wireless terminal monitors the transmission identified by an identifier specific for the wireless terminal (e.g. C-RNTI).

In an embodiment of being in the active time (of the MBS DRX) and a retransmission option for a PTP transmission is a PTP transmission, the wireless terminal may monitor/receive a PDCCH indicating a DL transmission. In this embodiment, the wireless terminal performs at least one of:

starting a third DL HARQ RTT timer (e.g. drx-HARQ-RTT-TimerDL0) associated with a terminal specific DRX (UE specific DRX) for a HARQ process of the DL transmission after a transmission carrying a DL HARQ feedback of the HARQ process, or stopping a third DL retransmission timer (e.g. drx-RetransmissionTimerDL0) associated with a terminal specific DRX for the HARQ process of the DL transmission.

In an embodiment of being in the active time (of the MBS DRX) and a retransmission option for a PTP transmission is a PTP transmission, the wireless terminal may monitor/receive a PDCCH indicating a DL transmission. In this embodiment, the wireless terminal performs at least one of:

starting or restarting a second DL HARQ RTT timer (e.g. drx-HARQ-RTT-TimerDL2) for a HARQ process of the PTM DL transmission after a transmission carrying a DL HARQ feedback of the HARQ process, or stopping the second DL retransmission timer (drx-RetransmissionTimerDL2) for the HARQ process of the PTM DL transmission.

In an embodiment, at least one MRB for the MBS is associated with a PTM transmission (e.g. PTM only MRB and/or split MRB). In this embodiment, the PTM transmission may be enabled/activated. For example, the PTM transmission may be enabled/activated by default, in case of the PTM only MRB, in case of split MRB or in case of the split MRB and the PTM transmission is enabled/activated by the network (e.g. via RRC signaling or DCI).

In an embodiment of being in the active time (of the MBS DRX) due to running of at least one of the on-duration timer for the MBS or the inactivity timer for the MBS, the wireless terminal monitors the transmission identified by a group identifier for a wireless terminal group (e.g. G-RNTI).

In an embodiment of being in the active time (of the MBS DRX) and a retransmission option for the PTM transmission is a PTM retransmission, the wireless terminal may monitor/receive a PDCCH indicating a PTM DL transmission (e.g. GC-PDCCH). In this embodiment, the wireless terminal performs at least one of:

starting or restarting a first DL HARQ RTT timer (e.g. drx-HARQ-RTT-TimerDL1) for a HARQ process of the PTM DL transmission after a transmission carrying a DL HARQ feedback of the HARQ process, or stopping the first DL retransmission timer (e.g. drx-RetransmissionTimerDL1) for the HARQ process of the PTM DL transmission.

In an embodiment of being in the active time (of the MBS DRX) and a retransmission option for the PTM transmission is a PTP retransmission, the wireless terminal may monitor/receive a PDCCH indicating a DL transmission. In this embodiment, the wireless terminal performs at least one of:

starting a third DL HARQ RTT timer (e.g. drx-HARQ-RTT-TimerDL0) associated with a terminal specific DRX (UE specific DRX) for a HARQ process of the DL transmission after a transmission carrying a DL HARQ feedback of the HARQ process, or stopping a third DL retransmission timer (e.g. drx-RetransmissionTimerDL0) associated with a terminal specific DRX for the HARQ process of the DL transmission.

In an embodiment of being in the active time (of the MBS DRX) and a retransmission option for the PTM transmission is a PTP retransmission, the wireless terminal may monitor/receive a PDCCH indicating a PTM DL transmission (e.g. GC-PDCCH). In this embodiment, the wireless terminal performs at least one of:

starting or restarting a second DL HARQ RTT timer (e.g. drx-HARQ-RTT-TimerDL2) for a HARQ process of the PTM DL transmission after a transmission carrying a DL HARQ feedback of the HARQ process, or stopping the second DL retransmission timer (drx-RetransmissionTimerDL2) for the HARQ process of the PTM DL transmission.

In an embodiment of being in the active time (of the MBS DRX) and a retransmission option for the PTM transmission is a blind retransmission, the wireless terminal may monitor/receive a PDCCH indicating a PTM DL transmission (e.g. GC-PDCCH). In this embodiment, the wireless terminal performs at least one of:

starting or restarting a first DL HARQ RTT timer (e.g. drx-HARQ-RTT-TimerDL1) for a HARQ process of the PTM DL (in the first symbol) after an end of the PTM DL transmission, stopping the first DL retransmission timer (e.g. drx-RetransmissionTimerDL1) for the HARQ process of the PTM DL transmission, or starting the first DL retransmission timer and monitoring the PTM DL transmission after the first DL HARQ RTT timer expires.

In an embodiment of being in the active time (of the MBS DRX) and a retransmission option for the PTM transmission is a blind retransmission, the wireless terminal may monitor/receive a PDCCH indicating a PTM DL transmission (e.g. GC-PDCCH). In this embodiment, the wireless terminal performs at least one of:

monitoring the PTM DL transmission, or starting the first DL retransmission timer (e.g. drx-RetransmissionTimerDL1) for a HARQ process of the PTM DL transmission (in the first symbol) after an end of the PTM DL transmission.

In an embodiment of being in the active time (of the MBS DRX), the wireless terminal monitors a PDCCH on at least one serving cell of the MBS DRX. Note that the PDCCH may be identified by either a terminal specific identifier (e.g. C-RNTI) or a group identifier for a wireless terminal group (e.g. G-RNTI). In this embodiment, the PDCCH may indicate a new/initial transmission (DL or UL) on the one of the at least one serving cell of the (MBS) DRX. Under such a condition, the wireless terminal starting or restarting the inactivity timer for the MBS after receiving the PDCCH indicating the new/initial transmission.

In an embodiment of being in the active time (of the MBS DRX), the wireless terminal monitors a PDCCH on at least one serving cell of the MBS DRX. In this embodiment, the PDCCH (e.g. GC-PDCCH) may indicate a new/initial PTM transmission (DL or UL) on the one of the at least one serving cell of the (MBS) DRX. Under such a condition, the wireless terminal starting or restarting the inactivity timer for the MBS after receiving the PDCCH indicating the new/initial PTM transmission.

In an embodiment, during the active time (of the MBS DRX), the wireless terminal transmits a MAC PDU in a configured uplink grant and does not receive (has not received) a LBT failure indication from lower layers. In this embodiment, the wireless terminal performs at least one of:

starting a UL HARQ RTT timer defined in (e.g. associated with, of, for) the MBS (DRX) (e.g. drx-RetransmissionTimerULMBS) for a HARQ process in the first symbol after the end of the first transmission of at least one PUSCH transmission corresponding to the MAC PDU; and/or stopping a UL retransmission timer defined in (e.g. associated with, of, for) the MBS (DRX) (e.g. drx-RetransmissionTimerULMBS) for a HARQ process at the first transmission of at least one PUSCH transmission corresponding to the MAC PDU.

In an embodiment, during the active time (of the MBS DRX), the wireless terminal transmits a MAC PDU in a configured uplink grant and does not receive (has not received) a LBT failure indication from lower layers. In this embodiment, the wireless terminal performs at least one of:

starting a UL HARQ RTT timer defined in (e.g. associated with, of, for) the UE specific DRX (e.g. drx-RetransmissionTimerUL) for a HARQ process in the first symbol after the end of the first transmission of at least one PUSCH transmission corresponding to the MAC PDU; and/or stopping a UL retransmission timer defined in (e.g. associated with, of, for) the UE specific DRX (e.g. drx-RetransmissionTimerUL) for a HARQ process at the first transmission of at least one PUSCH transmission corresponding to the MAC PDU.

In an embodiment, the wireless terminal may receive at least one of an RRC signaling or DCI indicating at least one retransmission opinion for at least one of a PTP transmission or a PTM transmission.

Figure 5:
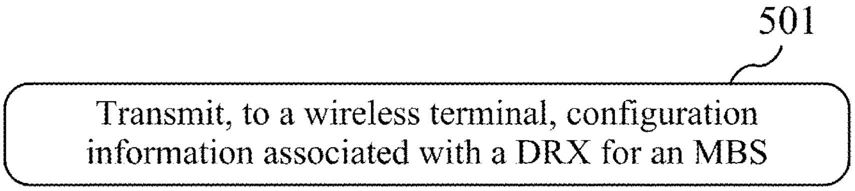
FIG. 5 shows a flowchart of a method according to an embodiment of the present disclosure.

FIG. 5 shows a flowchart of a method according to an embodiment of the present disclosure. The method shown in FIG. 5 may be used in a wireless network node (e.g. RAN node or gNB) and comprises the following step:

Step 501: Transmit, to a wireless terminal, configuration information associated with a DRX for an MBS.

In FIG. 5, the wireless network node transmits configuration information associated with a DRX for an MBS (i.e. MBS DRX) to a wireless terminal, e.g., for configuring the MBS DRX. The wireless network node communicates with the wireless terminal based on the configuration information (e.g. based on the configurations of the MBS DRX).

In an embodiment, the configuration information comprises (e.g. indicates) at least one of:

an on-duration timer (e.g. drx-onDurationTimerMBS), associated with a duration at a beginning of a DRX cycle for the MBS (DRX), a slot offset (e.g. drx-SlotOffsetMBS), associated with a delay before starting the on-duration timer, a long cycle start offset (e.g. drx-LongCycleStartOffsetMBS), associated with a Long DRX cycle and a start offset for determining a subframe where at least one of the Long DRX cycle or a short DRX cycle starts, an inactivity timer (e.g. drx-InactivityTimerMBS), associated with a duration after a physical downlink control channel, PDCCH, occasion in which a PDCCH indicates a transmission, a first DL HARQ timer (e.g. drx-HARQ-RTT-TimerDL1), associated with a minimum duration before a DL assignment for an HARQ retransmission in a PTM retransmission, a second DL HARQ RTT timer (e.g. drx-HARQ-RTT-TimerDL2), associated with a minimum duration before a DL assignment for an HARQ retransmission in a PTP retransmission, a first DL retransmission timer (e.g. drx-Retransmission-TimerDL1), associated with a maximum duration until a DL retransmission in a PTM retransmission is received, a second DL retransmission timer (e.g. drx-RetransmissionTimerDL2), associated with a maximum duration until a DL retransmission in a PTP retransmission is received, a UL HARQ RTT timer (e.g. drx-HARQ-RTT-TIMER-ULMBS), associated with a minimum duration before a UL HARQ retransmission grant is expected to be received during an active time associated with the DRX for the MBS, or a UL retransmission timer (e.g. drx-RetransmissionTimerULMBS), associated with a maximum duration until a grant for a UL retransmission is received during an active time associated with the DRX for the MBS.

In an embodiment, the UL HARQ RTT timer and/or the UL retransmission timer is associated with a terminal (UE) specific DRX.

In an embodiment, the wireless network node transmits at least one of an RRC signaling or DCI associated with enabling a PTM transmission to the wireless terminal.

In an embodiment, the wireless network node transmits at least one of an RRC signaling or DCI indicating at least one retransmission opinion for at least one of PTP transmission or a PTM transmission.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any one of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any one of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any one of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method for use in a wireless terminal, the method comprising:

receiving, from a wireless network node, configuration information associated with a discontinuous reception (DRX) for a multicast broadcast service (MBS), and performing the DRX configured based on the configuration information for the MBS;

wherein a long DRX cycle is used for the DRX for the MBS, wherein [(SFN×10)+subframe number] modulo (drx-LongCycleMBS)=drx-StartOffsetMBS, wherein the SFN is a system frame number, the subframe number is a numbering of a subframe, the drx-LongCycleMBS is a number of subframes in the long DRX cycle, and the drx-StartOffsetMBS is a start offset for the DRX for the MBS, and wherein performing the DRX for the MBS based on the configuration information comprises:

starting an on-duration timer for the MBS after a slot offset comprised in the configuration information.

2. The wireless communication method of claim 1, wherein the configuration information comprises at least one of:

an on-duration timer, associated with a duration at a beginning of a DRX cycle for the MBS, a slot offset, associated with a delay before starting the on-duration timer, a long cycle start offset, associated with a Long DRX cycle and a start offset for determining a subframe where at least one of the Long DRX cycle or a short DRX cycle starts, an inactivity timer, associated with a duration after a physical downlink control channel (PDCCH) occasion in which a PDCCH indicates a transmission, a first downlink (DL) hybrid automatic repeat request (HARQ) round trip time (RTT) timer, associated with a minimum duration before a DL assignment for an HARQ retransmission in a point-to-multi-point (PTM) retransmission, a second DL HARQ RTT timer, associated with a minimum duration before a DL assignment for an HARQ retransmission in a point-to-point (PTP) retransmission, a first DL retransmission timer, associated with a maximum duration until a DL retransmission in a PTM retransmission is received, a second DL retransmission timer, associated with a maximum duration until a DL retransmission in a PTP retransmission is received, an uplink (UL) HARQ RTT timer, associated with a minimum duration before a UL HARQ retransmission grant is expected to be received during an active time associated with the DRX for the MBS, or a UL retransmission timer, associated with a maximum duration until a grant for a UL retransmission is received during an active time associated with the DRX for the MBS.

3. The wireless communication method of claim 1, wherein at least one of an on-duration timer for the MBS, an inactivity timer for the MBS, a first DL retransmission timer associated with a PTM retransmission for the MBS, a second DL retransmission timer associated with a PTP retransmission for the MBS or a UL retransmission timer for the MBS is running, and wherein performing the DRX configured based on the configuration information for the MBS comprises: monitoring a transmission associated with the MBS;

wherein at least one MBS radio bearer for the MBS is associated with a PTP transmission.

4. The wireless communication method of claim 3, wherein at least one of the on-duration timer for the MBS or the inactivity timer for the MBS is running, and wherein the monitored transmission is identified by an identifier specific for the wireless terminal.

5. The wireless communication method of claim 3, wherein a retransmission option for a PTP transmission is a PTP retransmission, wherein the monitored transmission comprises a PDCCH indicating a DL transmission, and wherein performing the DRX configured based on the configuration information for the MBS comprises at least one of:

starting a third DL HARQ RTT timer associated with terminal specific DRX for a HARQ process of the DL transmission after a transmission carrying a DL HARQ feedback of the HARQ process, or stopping a third DL retransmission timer associated with a terminal specific DRX for the HARQ process of the DL transmission;

wherein a retransmission option for a PTP transmission is a PTP retransmission, wherein the monitored transmission comprises a PDCCH indicating a DL transmission, and wherein performing the DRX configured based on the configuration information for the MBS comprises at least one of:

starting or restarting a second DL HARQ RTT timer for a HARQ process of the PTM DL transmission after a transmission carrying a DL HARQ feedback of the HARQ process, or stopping the second DL retransmission timer for the HARQ process of the PTM DL transmission.

6. The wireless communication method of claim 3, wherein at least one MBS radio bearer for the MBS is associated with a PTM transmission.

7. The wireless communication method of claim 6, wherein the PTM transmission is enabled;

wherein the PTM transmission is enabled by at least one of a radio resource control signaling or downlink control information received from the wireless network node.

8. The wireless communication method of claim 3, wherein at least one of the on-duration timer for the MBS or the inactivity timer for the MBS is running, and wherein the monitored transmission is identified by a group identifier for a wireless terminal group.

9. The wireless communication method of claim 3, wherein a retransmission option for the PTM transmission is a PTM retransmission, wherein the monitored transmission comprises a PDCCH indicating a PTM DL transmission, and wherein performing the DRX configured based on the configuration information for the MBS comprises at least one of:

starting or restarting a first DL HARQ RTT timer for a HARQ process of the PTM DL transmission after a transmission carrying a DL HARQ feedback of the HARQ process, or stopping the first DL retransmission timer for the HARQ process of the PTM DL transmission;

wherein a retransmission option for the PTM transmission is a PTP retransmission, wherein the monitored transmission comprises a PDCCH indicating a DL transmission, and wherein performing the DRX configured based on the configuration information for the MBS comprises at least one of:

starting a third DL HARQ RTT timer associated with a unicast service for a HARQ process of the DL transmission after a transmission carrying a DL HARQ feedback of the HARQ process, or stopping a third DL retransmission timer associated with a unicast service for the HARQ process of the DL transmission;

wherein a retransmission option for a PTM transmission is a PTP retransmission, wherein the monitored transmission comprises a PDCCH indicating a PTM DL transmission, and wherein performing the DRX configured based on the configuration information for the MBS comprises at least one of:

starting or restarting a second DL HARQ RTT timer for a HARQ process of the PTM DL transmission after a transmission carrying a DL HARQ feedback of the HARQ process, or stopping the second DL retransmission timer for the HARQ process of the PTM DL transmission;

wherein a retransmission option for a PTM transmission is a blind retransmission, wherein the monitored transmission comprises a PDCCH indicating a PTM DL transmission, and wherein performing the DRX configured based on the configuration information for the MBS comprises at least one of:

starting or restarting a first DL HARQ RTT timer for a HARQ process of the PTM DL transmission after an end of the PTM DL transmission, stopping the first DL retransmission timer for the HARQ process of the PTM DL transmission, or starting the first DL retransmission timer and monitoring the PTM DL transmission after the first DL HARQ RTT timer expires;

wherein a retransmission option for a PTM transmission is a blind retransmission, wherein the monitored transmission comprises a PDCCH indicating a PTM DL transmission, and wherein performing the DRX configured based on the configuration information for the MBS comprises at least one of:

monitoring the PTM DL transmission, or starting the first DL retransmission timer for a HARQ process of the PTM DL transmission after an end of the PTM DL transmission.

10. The wireless communication method of claim 3, wherein the monitored transmission comprises a PDCCH on at least one serving cell of the DRX;

wherein the PDCCH indicates an initial transmission on one of the at least one serving cell of the DRX, and wherein performing the DRX configured based on the configuration information for the MBS further comprises:

starting or restarting the inactivity timer for the MBS after receiving the PDCCH indicating the initial transmission;

wherein the PDCCH indicates an initial PTM transmission on one of the at least one serving cell of the DRX, and wherein performing the DRX configured based on the configuration information for the MBS further comprises:

starting or restarting the inactivity timer for the MBS after receiving the PDCCH indicating the initial PTM transmission.

11. The wireless communication method of claim 10, wherein the PDCCH is identified by a terminal specific identifier for the wireless terminal or a group specific identifier for a wireless terminal group.

12. The wireless communication method of claim 1, wherein, during an active time of the DRX for the MBS, a media access control protocol data unit (MAC PDU) is transmitted in a configured uplink grant and a Listen Before Talk failure indication is not received from lower layers, wherein performing the DRX configured based on the configuration information for the MBS comprises at least one of:

starting a UL HARQ RTT timer of the MBS for a HARQ process in the first symbol after the end of the first transmission of at least one physical uplink shared channel, PUSCH, transmission corresponding to the MAC PDU; or stopping an UL retransmission timer of the MBS for a HARQ process at the first transmission of at least one PUSCH transmission corresponding to the MAC PDU; or wherein performing the DRX configured based on the configuration information for the MBS comprises at least one of:

starting a HARQ RTT timer defined in a terminal specific DRX for a HARQ process in the first symbol after the end of the first transmission of at least one PUSCH transmission corresponding to the MAC PDU; or stopping a UL retransmission timer defined in a terminal specific DRX for a HARQ process at the first transmission of at least one PUSCH transmission corresponding to the MAC PDU.

13. The wireless communication method of claim 1, further comprising:

receiving, from the wireless network node, at least one of a radio resource control signaling or downlink control information indicating at least one retransmission option for at least one of a PTP transmission or a PTM transmission.

14. A wireless communication method for use in a wireless network node, the method comprising:

transmitting, to a wireless terminal, configuration information associated with a discontinuous reception (DRX) for a multicast broadcast service (MBS);

wherein a long DRX cycle is used for the DRX for the MBS, wherein [(SFN×10)+subframe number] modulo (drx-LongCycleMBS)=drx-StartOffsetMBS, wherein the SFN is a system frame number, the subframe number is a numbering of a subframe, the drx-LongCycleMBS is a number of subframes in the long DRX cycle, and the drx-StartOffsetMBS is a start offset for the DRX for the MBS, and wherein the configuration information is configured for the wireless terminal to start an on-duration timer for the MBS after a slot offset comprised in the configuration information.

15. The wireless communication method of claim 14, wherein the configuration information comprises at least one of:

an on-duration timer, associated with a duration at a beginning of a DRX cycle for the MBS, a slot offset, associated with a delay before starting the on-duration timer, a long cycle start offset, associated with a Long DRX cycle and a start offset for determining a subframe where at least one of the Long DRX cycle or a short DRX cycle starts, an inactivity timer, associated with a duration after a physical downlink control channel, PDCCH, occasion in which a PDCCH indicates a transmission, a first downlink (DL) hybrid automatic repeat request (HARQ) round trip time (RTT) timer, associated with a minimum duration before a DL assignment for an HARQ retransmission in a point-to-multi-point (PTM) retransmission, a second DL HARQ RTT timer, associated with a minimum duration before a DL assignment for an HARQ retransmission in a point-to-point (PTP) retransmission, a first DL retransmission timer, associated with a maximum duration until a DL retransmission in a PTM retransmission is received, a second DL retransmission timer, associated with a maximum duration until a DL retransmission in a PTP retransmission is received, an uplink (UL) HARQ RTT timer, associated with a minimum duration before a UL HARQ retransmission grant is expected to be received during an active time associated with the DRX for the MBS, or a UL retransmission timer, associated with a maximum duration until a grant for a UL retransmission is received during an active time associated with the DRX for the MBS;

wherein the UL HARQ RTT timer and the UL retransmission timer are associated with a terminal specific DRX.

16. The wireless communication method of claim 14, further comprising:

transmitting, to the wireless terminal, at least one of a radio resource control signaling or downlink control information associated with enabling a point-to-multi-point, PTM, transmission.

17. The wireless communication method of claim 14, further comprising:

transmitting, to the wireless terminal, at least one of a radio resource control signaling or downlink control information indicating at least one retransmission option for at least one of a point-to-point, PTP, transmission or a PTM transmission.

18. A wireless terminal, comprising:

a communication unit, configured to receive, from a wireless network node, configuration information associated with a discontinuous reception (DRX) for a multicast broadcast service (MBS), and a processor configured to perform the DRX configured based on the configuration information for the MBS;

wherein a long DRX cycle is used for the DRX for the MBS, wherein [(SFN×10)+subframe number] modulo (drx-LongCycleMBS)=drx-StartOffsetMBS, wherein the SFN is a system frame number, the subframe number is a numbering of a subframe, the drx-LongCycleMBS is a number of subframes in the long DRX cycle, and the drx-StartOffsetMBS is a start offset for the DRX for the MBS, and wherein the processor is configured to perform the DRX configured based on the configuration information for the MBS in the following manner:

starting an on-duration timer for the MBS after a slot offset comprised in the configuration information.

19. A wireless network node, comprising:

a communication unit, configured to perform a wireless communication method of claim 14.

* * * * *